United States Patent [19]

Chakrabarti

[11] 3,928,274
[45] Dec. 23, 1975

[54] PROCESS FOR PREPARING NITRILES
[75] Inventor: Jiban Kumar Chakrabarti, Frimley, England
[73] Assignee: Lilly Industries, Ltd., London, England
[22] Filed: Aug. 29, 1973
[21] Appl. No.: 392,845

[52] U.S. Cl. ...... 260/294.9; 260/326.62; 260/465 F; 260/465 R; 260/465.1
[51] Int. Cl.² ............... C07D 213/57; C07C 120/00
[58] Field of Search .......... 260/465 B, 294.9, 465.1, 260/326.62, 465 R, 249.9

[56] References Cited
UNITED STATES PATENTS
2,455,651   12/1948   Bortnick .......................... 260/465 B
3,734,942   5/1973    Dennis ............................ 260/465 B OTHER PUBLICATIONS
Senier, Ber. Deut. Chem., Vol. 19, pp. 310–312, (1886).
Smolin et al., "S–Triazines and Derivatives," pp. 61–62, Interscience Publishers, Inc. NY (1959).
Houben–Weyl, "Methoden Der Organischen Chemie", 4th Ed., Band VIII, pp. 325–333, Georg Thieme Verlag, Stuttgart, Germany (1952).
Klingsberg, "Pyridine and its Derivatives," pp. 231–232 (Interscience Publishers, Inc.), NY (1962).
Chemical Abstracts I, Vol. 74, Abst. No. 12788d (1971) (Abst. of Yamato et al.).
Chemical Abstracts II, Vol. 75, Abst. No. 63349q (1971) (Abst. of Appel et al.).

*Primary Examiner*—John D. Randolph
*Attorney, Agent, or Firm*—James L. Rowe; Everet F. Smith

[57] ABSTRACT

Nitriles are prepared rapidly and under mild conditions by reacting the corresponding aldoxime with cyanuric chloride in the presence of a base, the reaction usually taking place at around room temperature and with molar ratios of aldoxime to cyanuric halide of from 3:1 to 2:1.

3 Claims, No Drawings

PROCESS FOR PREPARING NITRILES

BACKGROUND OF THE INVENTION

It has long been known to prepare nitriles from aldehydes, see for example Houben-Weyl, Methoden der Organischen Chemie, Vol. III, 325 (1952), but these known methods normally require vigorous reaction conditions thus rendering them unsuitable for general application, particularly where a relatively unstable aldehyde is involved. Various mild procedures for carrying out the conversion of aldehydes to nitriles have been proposed over the years but these procedures have been relatively specific to the aldehyde concerned and/or required the use of various reagents which are not generally available or are expensive to use.

It has now been discovered that aldehydes can be converted to nitriles rapidly and under very mild conditions by reaction of the oxime of the aldehyde with cyanuric chloride, the latter being of course a readily available, inexpensive material.

DETAILED DESCRIPTION

According to the present invention therefore, there is provided a process for preparing nitriles from the corresponding aldoxime which comprises reacting the aldoxime with cyanuric chloride in the presence of a base, preferably an organic base such as pyridine. In order to obtain the highest yields, the molar ratio of aldoxime to cyanuric chloride is preferably 3:1 to 2:1.

The reaction is normally carried out in a suitable reaction solvent, for example, chloroform, dichloromethane, ether, tetrahydrofuran or dioxan, and at a temperature of from 20° to 30°C. Higher temperatures may of course be used where the aldoxime is sufficiently stable and, in such situations, the reaction may be completed by refluxing for approximately 1 to 3 hours. The reaction is normally completed within 1 to 16 hours even where the use of elevated temperatures is avoided. At the completion of the reaction, any precipitate is removed, for example by filtration or by washing with water, and if desired the resultant nitrile is purified, for example, by distillation, sublimation or crystallisation.

The process of the present invention has general applicability in the preparation of aliphatic, aromatic and hetero-aromatic nitriles. More particularly the process may be applied to the conversion to the corresponding nitriles of alkanal oximes, especially $C_{2-6}$ alkanal oximes such as ethanal oxime, isopropanal oxime, butanal oxime, pentanal oxime, sec.-pentanal oxime and hexanal oxime; benzaldehyde oximes such as benzaldoxime itself and nitro, $C_{1-4}$ alkyl or $C_{1-4}$ alkoxy derivatives thereof such as 4-nitrobenzaldoxime, 2,4-dimethylbenzaldoxime, 4-ethylbenzaldoxime, 4-ethylbenzaldoxime, 4-isopropylbenzaldoxime, 4-t-butylbenzaldoxime, 3,4,5-trimethoxybenzaldoxime, 2,4-dimethoxybenzaldoxime, 4-propoxybenzaldoxime and 4-butoxybenzaldoxime; and pyrrolyl- and pyridyl-aldoximes optionally substituted by $C_{1-4}$ alkyl such as 2-pyrrolylaldoxime, 1-methyl-2-pyrrolylaldoxime, 1,3,5-trimethyl-2-pyrrolylaldoxime, 1-ethyl-3-pyrrolylaldoxime, 1-isopropyl-2-pyrrolylaldoxime, 1-butyl-2-pyrrolylaldoxime, 2-pyridylaldoxime, 3-pyridylaldoxime, 4-pyridylaldoxime, 4-methyl-2-pyridylaldoxime, 5-isopropyl-2-pyridylaldoxime and 6-s-butyl-3-pyridylaldoxime.

The foregoing aldoximes are either known per se or may be prepared from the corresponding aldehydes by reaction of the latter with hydroxylamine.

The following Examples will serve to illustrate the general applicability of the process of this invention:

EXAMPLE 1

To a solution of 3,4,5-trimethoxybenzaldoxime (1.1 g., 5 m. mole) in dichloromethane (10 ml.) was added dropwise, with stirring, pyridine (0.45 ml., 5 m. mole) and a solution of cyanuric chloride (0.32 g., 1.8 m. mole) in dichloromethane (5 ml.) at room temperature. Upon completion of the addition, the mixture was refluxed for 2 hours, then filtered, washed with dichloromethane, the solvent evaporated and the resultant solid sublimed to yield 3,4,5-trimethoxybenzonitrile, m.p. 92°C., (yield 92%).

EXAMPLE 2

In the same general manner as described in Example 1 but reversing the order of addition of the reactants and using dichloromethane/dioxan (1:2 vol.), 2-pyridylaldoxime was converted to 2-pyridylnitrile in 63% yield.

EXAMPLE 3

In the same manner as in Example 1 but using dioxan as solvent, 1-methyl-2-pyrrolylaldoxime was converted to 1-methyl-2-pyrrolylnitrile in 70% yield.

EXAMPLES 4 to 6

By the method of example 1, the undermentioned aldoximes were converted to the corresponding nitriles in the stated yields:

| Aldoxime | Nitrile Yield |
| --- | --- |
| Benzaldoxime | 82% |
| 4-Nitrobenzaldoxime | 92% |
| Butanal oxime | 64% |

I claim:

1. Process for preparing nitriles which comprises the essential step of reacting the corresponding aldoxime with cyanuric chloride in a mutual solvent in the presence of pyridine at a temperature in the range 20°–30°C. wherein said aldoxime is a $C_2$–$C_6$ alkanal oxime, a pyridyl aldoxime, a pyrrolyl aldoxime, benzaldoxime or a substituted benzaldoxime wherein said substitutents can be $C_1$–$C_4$ alkyl, $C_1$–$C_4$ alkoxy or nitro.

2. Process as claimed in claim 1, wherein the molar ratio of aldoxime to cyanuric chloride is 3:1 to 2:1.

3. Process as claimed in claim 1, wherein said alkanal oxime is butanal oxime.

* * * * *